UNITED STATES PATENT OFFICE.

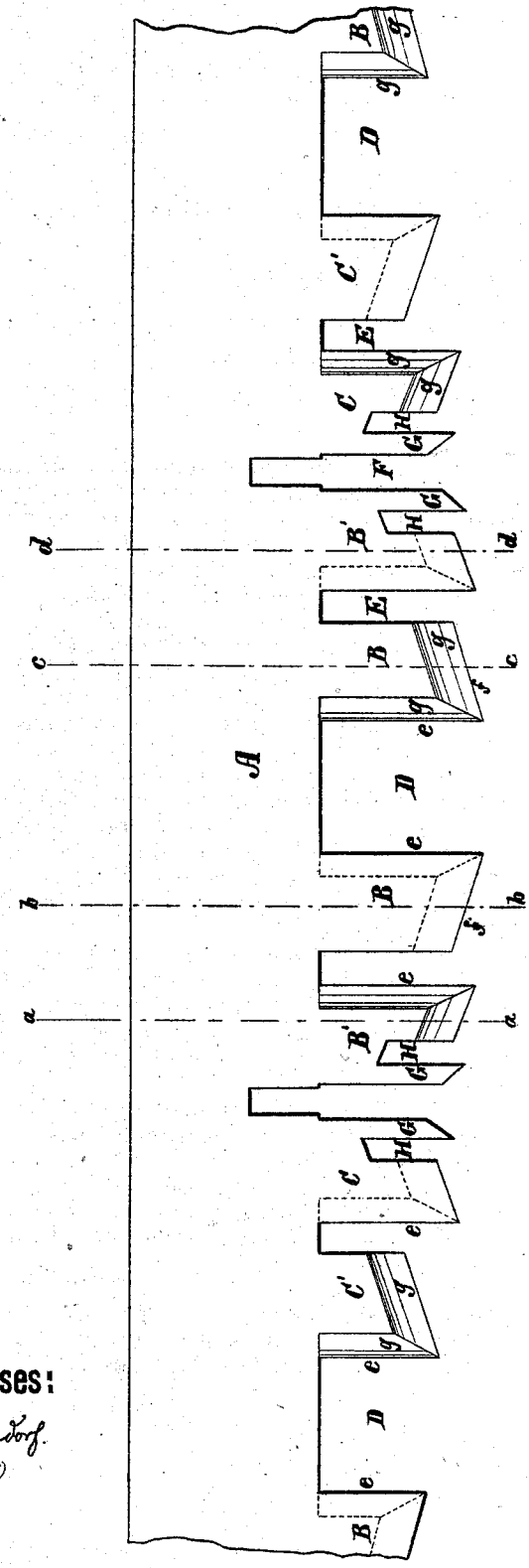

SYLVESTER COOK, OF ALPENA, MICHIGAN.

IMPROVEMENT IN SAWS.

Specification forming part of Letters Patent No. 141,036, dated July 22, 1873; application filed May 10, 1873.

*To all whom it may concern:*

Be it known that I, SYLVESTER COOK, of Alpena, in the county of Alpena and State of Michigan, have invented a new Improvement in Saws, of which the following is a specification:

I propose to divide the teeth of a cross-cut saw into groups of four teeth in each group by a wide blank space of about one inch between each group, and in each group I have two fronting one way and two the other, with their cutting-edges formed at right angles to the longitudinal axis of the saw; the ends beveled enough for clearance, and the cutting-edges and ends shaped like a chisel-edge by beveling them on one side only, and the beveled sides are alternately reversed; and at the heel of each rear tooth of a pair I have a cleaner, for scraping out the chips cut off by the teeth, said cleaner being an extension of the heel of the tooth as low as the point, with a face as wide as the thickness of the saw-plate.

Figure 1 is a side elevation of a saw constructed according to my invention. Figs. 2, 3, 4, and 5 are sections on the lines *a b c d*, respectively.

Similar letters of reference indicate corresponding parts.

A represents the saw-plate. B B' and C C' represent the four teeth of a group. D represents the wide space between the groups; E and F, notches between the teeth of a group. G represents the clearers; H, the notches between the clearers and the teeth whereon they are formed. The edges *e* of the teeth are formed at right angles to the longitudinal axis of the saw. The ends *f* are beveled enough for clearance. *g* represents the flare upon the sides of the teeth, by which they are formed with chisel-shaped cutting-edges. The clearers G are made as thick as the saw-plate, so as to scrape off the chips which are severed at the ends by the sharp chisel-edges.

The teeth are alternately beveled or flared on the opposite sides to make the cutting-edges; and they may be bent in the same manner to produce the necessary set.

By the reversed arrangement of the pairs of teeth and clearers of each group the action of the saw is alike in both directions. The straight chisel-shaped edges are more efficient for cutting off the fibers than the teeth, which are so formed as to both cut and clear out the chips.

The notches F are made about as deep as the plate will admit of; and the others will be gummed out from time to time, as required.

Having thus described my invention, I claim as new and desire to secure by Letters Patent—

The teeth, arranged in groups of four, separated by the wide notches D, said groups, arranged in pairs B B' and C C', fronting in opposite directions, the teeth being constructed as described, and having a clearer, G, arranged with each pair, all substantially as specified.

SYLVESTER COOK.

Witnesses:
ALEXANDER MUIRISON,
WILLIAM HOLMES.